United States Patent [19]

Mohilef

[11] Patent Number: 5,897,893
[45] Date of Patent: Apr. 27, 1999

[54] PET CHEW WITH EDIBLE TUBULAR WRAPPER AND METHOD OF MAKING SAME

[75] Inventor: David Michael Mohilef, Chatsworth, Calif.

[73] Assignee: Pet Center, Inc., Los Angeles, Calif.

[21] Appl. No.: 08/893,292

[22] Filed: Jul. 15, 1997

Related U.S. Application Data

[XX .
[60] Provisional application No. 60/028,900, Oct. 21, 1996.

[51] Int. Cl.⁶ .............................. A23K 1/00; A01K 29/00
[52] U.S. Cl. ........................... 426/89; 426/140; 426/635; 426/641; 426/805; 119/709
[58] Field of Search .............................. 426/89, 635, 805, 426/641, 140; 119/709

[56] References Cited

U.S. PATENT DOCUMENTS

| | | | |
|---|---|---|---|
| 1,945,886 | 2/1934 | Ragals | 426/140 |
| 2,062,489 | 12/1936 | Adams | 426/140 |
| 4,260,635 | 4/1981 | Fisher | 426/3 |
| 4,880,642 | 11/1989 | Berends | 426/5 |
| 5,084,297 | 1/1992 | Merrick | 426/641 |
| 5,148,770 | 9/1992 | O'Rourke | 119/29 |
| 5,149,550 | 9/1992 | Mohilef | 426/3 |
| 5,339,771 | 8/1994 | Axelrod | 119/710 |
| 5,532,010 | 7/1996 | Spanier et al. | 426/94 |
| 5,673,653 | 10/1997 | Sherrill | 119/707 |

OTHER PUBLICATIONS

Commercial Product that is believed to be sold under the name Moo Hoofers at least as early as Aug. 1996. Enclosed is a copy of the reference.

*Primary Examiner*—Nina Bhat
*Attorney, Agent, or Firm*—Virginia H. Meyer, Esq.

[57] ABSTRACT

A pet chew comprised of an inner bone or bone-like core, and at least one outer edible tubular wrapper layer composed of dried animal viscera or other tubular food product compositions.

33 Claims, No Drawings

5,897,893

PET CHEW WITH EDIBLE TUBULAR WRAPPER AND METHOD OF MAKING SAME

RELATED APPLICATION

This application claims the benefit of U.S. Provisional Patent Application Ser. No. 60/028,900, filed Oct. 21, 1996.

FIELD OF THE INVENTION

This invention relates to pet chews and methods for making them. More specifically, the invention relates to pet chew "bones" having an inner bone or bone-like core and a tubular edible wrapper layer composed of animal viscera, jerky, or other suitable food product, and methods for making these new pet chew "bones".

BACKGROUND OF THE INVENTION

It is well known that carnivorous animals such as dogs benefit greatly from chewing or masticating bones. Chewing on bones provides needed jaw exercise for domesticated dogs who are fed soft or wet food products for which little chewing action is required. Furthermore, bone chewing is believed to provide a cleaning effect to the teeth. Specifically, as a dog chews on a bone, the abrasion of the teeth against bone fragments on the outer surface of the bone performs this cleaning function.

There are many pet chews known in the art, including natural and synthetic animal bones, animal hooves, rawhide and the like. While these pet chews provide a dog with ample opportunity to exercise the jaw muscles and to clean portions of the teeth, there is a need for a type of pet chew that provides a dog with greater motivation to scrape its teeth, especially the lateral regions thereof, along the surface of a bone or bone-like material, thereby achieving an enhanced teeth cleaning effect. While the pet chews of the prior art fulfill their respective functions and objectives, they do not describe or suggest a pet chew having an inner bone or bone-like core and a tubular edible wrapper layer composed of viscera or other suitable food product, that motivates a dog to chew on the pet chew, thereby scraping its teeth along the surface of the bone-like core. To this end, the pet chew of the present invention provides a canine with greater motivation to scrape its teeth against the outer surface of the core. This motivation is accomplished by surrounding, in whole or in-part, the bone or bone-like core with a tubular edible wrapper layer composed of a tubular animal organ or other suitable food product, such as jerky extruded in tube-form. This outer edible wrapper layer has a highly desirable taste, which motivates the canine to remove this layer thereby scraping its teeth against the outer surface of the bone or bone-like core material.

Therefore, it can be appreciated that a need exists for a new, inexpensive, and easy-to-manufacture pet chew and method of making the same that provides enhanced teeth cleaning action for pets. The device and method of the present invention substantially fulfill this need.

SUMMARY OF THE INVENTION

The present invention provides a new pet chew comprised of an inner bone or bone-like core, and at least one outer edible tubular wrapper layer composed of dried animal viscera or other tubular food product compositions. (As used herein, bone is used generically to mean natural or synthetic bone, as well as other suitable natural or synthetic bone-like "core" material on which a dog can safely chew. Suitable bone-like core materials include, but are not limited to, hardened animal parts, such as dried trachea, dried lungs, dried ears, dried viscera, and the like; rawhide; jerky; hooves; and the like.)

The pet chew of the present invention motivates or causes a dog to expose or abrade the lateral regions of its teeth against the bone or bone-like surface. Specifically, in the effort to remove the outer edible tubular wrapper layer, the dog must scrape along the bone surface. With this scraping action, the dog brings the lateral regions of the teeth into contact with the core surface. In this manner, the pet chew achieves an enhanced cleaning effect to canine teeth over the pet chews of the prior art.

The present invention also provides methods for making pet chews from bone, bonestock, or other suitable chewable core materials, and suitable outer edible wrapper layers. In preferred form, the outer edible wrapper layers will be formed from tubular animal viscera. Alternatively, the edible wrapper layers can be formed from wet food compositions that can be extruded as tubes. The method of the present invention involves placing a selected tubular animal viscera, or a "tubular composition" wrapper made of suitable foods, around a bone or a bone-like core, and then dehydrating this assembly such that the animal viscera or composition wrapper, shrinks to substantially conform to and surround the whole or a portion of the bone or bone-like core. In preferred form, the pet chews of the invention will have but one tubular edible wrapper layer. However, if desired, two or more additional edible wrapper layers can be added to the pet chews of the invention.

DETAILED DESCRIPTION OF THE INVENTION

The present invention relates to a new pet chew that provides a canine with greater motivation to clean the lateral regions of its teeth. In its broadest context, the present invention comprises a bone or bone-like core surrounded in whole or in part by an tubular edible wrapper layer composed of tubular viscera or tubular food composition.

The bone or bone-like core of the present invention preferably performs two functions. First, the bone or bone-like core provides the means by which canine teeth are cleaned. Accordingly, the bone or bone-like core must be safe and suitable for mastication by canines. Namely, it must have the strength to provide chewing exercise to a pet and it must have an outer surface capable of appropriately abrading the surface of a canine's or other animal's tooth. Second, the bone or bone-like core must support the outer edible tubular wrapper layer. Suitable core materials may include natural or synthetic and/or simulated bone or bone-like materials. Natural materials may include natural bone from cows or other animals (such as bulls, swine, sheep, oxen, horses, and buffalo, etc). The type and particular dimensions of the bone are not crucial to practice the invention. By way of example, but not limitation, the bone core of a preferred embodiment comprises a beef rib bone cut to about 6 inches long. The bone core may also comprise a synthetic bone product, such as the simulated bone described in U.S. Pat. No. 3,899,607 that issued to Timothy Miller et al. Aug. 12, 1975. In other preferred embodiments, the bone-like core can be comprised of animal parts, such as dried and hardened trachea or other dried and hardened animal parts, hooves, rawhide, or jerky. In summary, any natural or synthetic material that is safe and suitable for mastication by canines, and can support the outer edible wrapper layer is suitable for use as a "core" material in the practice of the present invention.

The outer edible tubular wrapper layers may take several forms without departing from the scope of the invention. The outer layer need only be palatable to canines or other pets and be capable of substantially conforming to a suitable bone or bone-like core in order to form a suitable pet chew of this invention. More specifically, the palatability of the outer layer should provide a dog or target animal the motivation to use its teeth to remove the outer layer from the inner bone core. In the effort to remove the outer visceral layer, the animal scrapes and consequently cleans its teeth along the bone core surface. In preferred forms, there will be a single outer layer comprised of tubular offal or animal viscera that shrink in size to closely surround the bone core. Most preferably, such viscera or entrails are tube-like organs, such as the esophagus, intestines or stomach, that have some elasticity. Use of these "tube-like", "elastic" organs achieves the least labor intensive product because these organs are best suited for forming around a bone or bone-like core. As a result, these tube-like, elastic organs are most preferred because they require little, if any, adaptation, other than a dehydrating/shrinking step, to conform to and surround the bone core.

By way of example, in a preferred method of the invention, a bovine esophagus is placed over a beef rib bone and dried by any suitable method to shrink the esophagus over the bone. In this manner, the outer visceral layer substantially conforms to and surrounds the outer surface of the bone core. If desired, the process can be repeated, that is, one or more additional layers of esophagus can be added to the bone chew, with appropriate drying between each additional layer. In another preferred form, the bovine esophagus can be configured to cover only a portion of the length of the bone core to provide a pet chew with a partially exposed bone core.

Still further, the outer layer may comprise a jerky-type product, such as that disclosed in U.S. Pat. No. 5,026,572 issued to Denny Neiberger Jun. 25, 1991. In this embodiment, the outer edible wrapper layer comprises an extruded jerky material common to many dog treats. The jerky may be extruded in cylindrical form and placed around the bone core before a final shrinking step is performed.

Additionally, the outer layer may be fortified with essential nutrients that are desirable for a pet to consume. Such nutrients include, but are not limited to, calcium, potassium, and other vitamins and minerals.

The present invention also provides methods for making pet chews with an outer edible wrapper layer. The invention is based upon the discovery that animal viscera, when dried or dehydrated, shrink down and substantially conform to the object around which they are placed. According to the teaching of the invention, selected tubular animal viscera (or tubular composition food product) are placed over animal bone (or bone-like core) and dried such that the viscera shrinks down and substantially conforms to the outer surface of the bone. By this method, the pet chews of the present invention are fabricated.

According to the present invention, suitable bones and animal viscera from cattle and other animals are obtained from butchers or slaughter houses, or from other suitable sources. In selecting the appropriate animal bones and viscera, consideration must be given to their relative sizes. Additionally, animal viscera having suitable shrinking properties must be selected to practice the present invention. Further, both the selected animal bone and tubular viscera must be large enough with respect to one another, such that the animal viscera will shrink, when dehydrated, to substantially conform to the outer surface of the bone. Selection of the animal bone and tubular viscera will also depend upon cost and the other criteria discussed above. In preferred form, the selection of animal bone and viscera will achieve a cost efficient product in terms of both cost of components and labor. For example, a tube-like organ, like a bovine esophagus, has two advantages. First, it is generally relatively inexpensive to procure. Secondly, its tube-like shape requires little labor other than merely placing the esophagus over the bone core, before the assembly is dried. Other viscera and composition products may require additional steps to form them into tubes before they are wrapped around the bone core.

Next, the bone core and outer layer are assembled. As discussed above, the outer edible wrapper layer preferably comprises a tube-like organ of an animal such that assembly of the pet chew is facilitated. Under this embodiment, the outer layer is manually slipped around the bone core. The outer edible wrapper layer may be secured with string or other securing means at one or both ends of the bone to prevent unintentional displacement during later steps. Additionally, the outer layer may comprise a jerky-type composition product extruded in tube-like form. In this embodiment, the assembly is substantially identical to that of the tube-like organ assembly.

After the edible outer wrapper layer and bone core are assembled, the assembly is dehydrated to shrink the edible outer wrapper layer, causing it to substantially conform to the outer surface of the bone core. Any suitable drying method can be used, from drying the product in the "air" to drying it in a suitable oven. In one preferred form, dehydration is performed in a drying room, preferably with air circulating, at temperatures of about 90–200 degrees F, and most preferably at about 120–165 degrees F. At the 120–165 degree F temperature range, dehydration is accomplished in about 24 to 72 hours. In another preferred form, ordinary convection ovens are used to perform this dehydration step. Similarly, time and temperature may be varied, so long as the selected edible outer wrapper layer shrinks a sufficient amount to substantially conform to the outer surface of the bone core, and ultimately dries. Furthermore, dehydration conditions may vary with the specific types of edible outer wrapper layers employed. After the assembly is dehydrated, any attached twine, string or other securing means may be removed.

Lastly, the pet chew of this invention may undergo a final, but non-essential, "dressing" step to achieve a commercially acceptable look. At this stage, the dried assembly is cut such that any end of the bone core remaining uncovered by the outer layer is removed. Additionally, the dried assembly may be cut again into pet chews of desired lengths. In preferred embodiments, the pet chews are cut in about 3–12 inch lengths, and most preferably in 4–7 inch lengths. It should also be noted that this cutting or dressing phase can be done before the assembly are dehydrated. In preferred form, however, this step is performed after the assemblies have dried. Additionally, this cutting phase can be performed with a butcher's saw or any other device suitable for cutting bones or synthetic bone materials.

OBJECTS OF THE INVENTION

It is an object of the present invention to provide a new pet chew that achieves an enhanced teeth cleaning effect.

It is still another object of the present invention to provide a method for making a pet chew having an inner bone core and an outer edible tubular wrapper layer.

It is another object of the present invention to provide a pet chew that is capable of being made of offal from a butcher or slaughterhouse, and thus yielding a low cost product.

It is another object of the present invention to provide a new pet chew that can be easily and efficiently manufactured and marketed.

It is yet another object of the present invention to provide a new pet chew that is susceptible of a low cost of manufacture with regard to both materials and labor.

These together with other objects of the invention, along with various features of novelty that characterize the invention, are pointed out with particularity in the claims annexed to and forming a part of this disclosure. For a better understanding of the invention, its operating advantages and the specific objects attained, reference should be had to the accompanying descriptive matter which discloses preferred embodiments of the invention.

EXAMPLE 1

Dried Bovine Esophagus Surrounding Beef Bone

For the pet chew of the first preferred embodiment, two beef rib bones approximately 12–13 inches in length are selected as bone core. In alternative embodiments, beef shins may be selected as the bone core. Further, a raw bovine esophagus is selected as the edible outer wrapper layer. A typical bovine esophagus is approximately 24–30 inches long. Accordingly, the one end of the bovine esophagus is slipped over one bovine rib bone, and the other end is slipped over a second bovine rib bone, to form one long bone-viscera assembly. Alternatively, one bovine esophagus is cut into two equal pieces. Each piece is then placed over a typically sized beef rib bone to form two bone-viscera assemblies.

Next, these assemblies undergo a drying or curing step. Specifically, the bone core and outer visceral layer are placed in a drying room with air circulating within. The drying room is heated to about 130 degrees F. The esophagus-rib bone assemblies are dehydrated for about 60 hours. During this time, the bovine esophagus shrinks to substantially conform to the outer surface of the bone.

During the final, but non-essential step, the bone-viscera assemblies are "dressed." In this step, a butcher's saw is used to cut the pet chew of the invention into desired lengths. In this embodiment, the pet chews are cut to about 6 inches in length. In this manner, pet chews of the present invention are formed from low-cost meat by-products (two bovine rib bones and one bovine esophagus) with little added labor.

EXAMPLE 2

Dried Beef Jerky Composition Surrounding Beef Bone

Coarsely ground wet beef waste is added to a bowl cutter containing rice, which had been previously steamed, salt, sucrose, food yeast, hydrolyzed plant protein powder, and preservatives. Suitable preservatives include potassium sorbate and potassium chloride. The bowl cutter is operated until a cohesive blend of ingredients is achieved. The mix is then extruded in tubular form, with a thickness of about 2 millimeters.

The tubular product is placed around the bone core. The bone core of this example is again a beef rib bone. The assemblies are then dehydrated in a drying room for about 12 to 18 hours at about 130 deg. F. After dehydration, the assemblies are dressed to form a product having a commercially acceptable appearance. Particularly, any end of the bone remaining uncovered is cut away with a butcher's saw. The assemblies are also cut to desired lengths.

EXAMPLE 3

Dried Beef Esophagus Partially Covering Animal Hoof

For the pet chew of the third preferred embodiment, a bovine hoof is selected as the bone-like core. The bovine hoof is prepared for use by being cleaned and deburred. Further, raw beef esophagus is selected as the edible tubular wrapper layer. The beef esophagus is cut such that it may be placed around the circumference of the hoof, but covering only a part of the length of the hoof. This cut piece of beef esophagus is then placed over the bovine hoof to form a hoof-viscera assembly.

Next, this assembly undergoes a drying or curing step. Specifically, the bone core and outer esophagus layer are placed in a drying room with air circulating within. The drying room is heated to about 130 degrees F. The esophagus-hoof assembly is dehydrated for about 18 to 24 hours. During this time, the beef esophagus shrinks to substantially conform to the portion of the outer surface of the hoof over which the beef esophagus has been placed. In this manner, a pet chew of the present invention is formed where the outer visceral layer covers a portion of the length of the bone or bone-like core.

CONCLUSION

Without departing from the spirit and scope of this invention, one of ordinary skill in the art can make various changes and modifications to the invention to adapt it to various usages and conditions. As such, these changes and modifications are properly, equitably, and intended to be, within the full range of equivalents of the following claims.

What is claimed as being new and desired to be protected by letters patent of the United States is as follows:

1. A pet chew comprising:
   bone core means having an outer surface, and
   at least one outer edible tubular wrapper layer surrounding said bone core means over at least a portion of the length of said bone core means and dried to substantially conform to said outer surface of said bone core means, wherein said outer edible tubular wrapper layer is comprised of a layer selected from the group consisting of tubular animal viscera, and extruded tubular jerky.

2. A pet chew of claim 1 wherein said bone core means comprise natural bone selected from the group consisting of cows, bulls, swine, sheep, oxen, horses, goats, and buffalos.

3. A pet chew of claim 1 wherein said bone core means comprise bone product from the group consisting of synthetic bone and simulated bone.

4. A pet chew of claim 1 wherein said bone core means comprise beef bone.

5. A pet chew of claim 1 wherein said bone core means is selected from the group of animal products consisting of hooves, dried and hardened tracheas, rib bones, leg bones, dried ears, and rawhides.

6. A pet chew of claim 1 wherein said outer edible tubular wrapper layer comprises tubular viscera from the group consisting of cows, bulls, swine, sheep, oxen, horses, goats, buffalos, poultry, fowl, and fish.

7. A pet chew of claim 1 wherein said outer edible tubular wrapper layer comprises esophagus from the group consisting of cows, bulls, sheep, oxen, horses, goats, and buffalos.

8. A pet chew of claim 1 wherein said outer edible tubular wrapper layer comprises intestines from the group consisting of cows, bulls, swine, sheep, oxen, horses, goats, and buffalos.

9. A pet chew of claim 1 wherein said outer edible tubular wrapper layer comprises bovine esophagus.

10. A pet chew of claim 1 wherein said outer edible tubular wrapper layer is fortified with essential nutrients that are desirable for a pet to consume.

11. A pet chew of claim 1 wherein said outer edible tubular wrapper layer comprises a jerky-style food product extruded in tube-like form.

12. A pet chew comprising:
   bone core means having an outer surface wherein said bone core means are selected from the group consisting of beef bones and dried and hardened beef trachea, and
   at least one outer edible tubular wrapper layer surrounding said bone core means over at least a portion of the length of said bone core means and dried to substantially conform to said outer surface of said bone core means, wherein said outer edible tubular wrapper layer is selected from the group consisting of animal viscera and animal offal.

13. A pet chew comprising at least one beef bone and at least one outer edible tubular wrapper layer surrounding said bone core means over at least a portion of the length of said bone core means and dried to substantially conform to the outer surface of said beef bone, wherein said outer edible tubular wrapper layer is an animal viscera.

14. A pet chew comprising a hoof of an animal, said animal selected from the group consisting of cows, bulls, swine, sheep, oxen, horses, goats, and buffalos, and at least one outer edible tubular wrapper layer dried to substantially conform to and surround at least a portion of the outer surface of said hoof, wherein said outer edible tubular wrapper layer is animal viscera.

15. A pet chew comprising a beef rib bone and a tubular section of bovine esophagus, said section of bovine esophagus surrounding said beef rib bone; said section of bovine esophagus dried to substantially conform to said beef rib bone.

16. A pet chew comprising:
   bone core means having an outer surface, and
   at least one outer edible wrapper layer surrounding said bone core means over at least a portion of the length of said bone core means and dried to substantially conform to said outer surface of said bone core means, wherein said outer edible wrapper layer is comprised of a tubular organ of an animal selected from the group consisting of cows, bulls, swine, sheep, oxen, horses, goats, buffalos, poultry, fowl, and fish.

17. The pet chew of claim 16 wherein said edible outer wrapper layer is selected from the group consisting of animal intestines and esophagus.

18. A method of making a pet chew consisting essentially of:
   (a) placing an outer edible tubular wrapper layer around at least a portion of the length of a bone core means,
   (b) drying said wrapped bone means at least until said outer edible tubular wrapper layer shrinks to substantially conform to the outer surface of said bone core means and surround said bone core means over at least a portion of said length of said bone core means.

19. A method of claim 18 wherein said bone core means comprise natural bone selected from the group consisting of cows, bulls, swine, sheep, oxen, horses, goats, and buffalos.

20. A method of claim 18 wherein said bone core means comprise bone product from the group consisting of synthetic bone and simulated bone.

21. A method of claim 18 wherein said bone core means comprise beef bone.

22. A method of claim 18 wherein said edible outer tubular wrapper layer comprises viscera from the group consisting of cows, bulls, swine, sheep, oxen, horses, goats, buffalos, poultry, fowl, and fish.

23. A method of claim 18 wherein said outer edible wrapper layer comprises esophagus from the group consisting of cows, bulls, swine, sheep, oxen, horses, goats, and buffalos.

24. A method of claim 18 wherein said edible outer wrapper layer comprises intestines from the group consisting of cows, bulls, swine, sheep, oxen, horses, goats, and buffalos.

25. A method of claim 18 wherein said edible outer wrapper layer comprises bovine esophagus.

26. A method of claim 18 wherein said edible outer wrapper layer is fortified with nutrients that are desirable for a pet to consume.

27. A method of claim 18 wherein said edible outer wrapper layer comprises a jerky-style product extruded in tube-like form.

28. A method of claim 18 further comprising the step of cutting the pet chew to desired lengths.

29. A method of making a pet chew comprising:
   (a) placing bovine esophagus around at least a portion of the length of a bone core means selected from the group consisting of beef bone, dried bovine trachea, and dried bovine lungs,
   (b) drying the esophagus-bone core means assembly from step (a) at least until the outer visceral layer shrinks to substantially conform to the outer surface of said bone core means and surround said bone core means over at least a portion of the length of said bone core means.

30. A method of making a pet chew comprising:
   (a) extruding jerky in tube-like form and substantially covering bone core means with said extruded jerky,
   (b) drying the jerky covered bone core means from step (a) at least until said jerky shrinks to substantially conform to the outer surface of said bone core means and surround said bone core means over at least a portion of the length of said bone core means.

31. A method of making a pet chew comprising:
   a) placing bovine esophagus over bovine rib bone to make a esophagus-rib bone assembly;
   b) drying said esophagus-rib bone assembly from step (a) in a drying room with air circulating within, wherein said drying room is heated to about 90–200 degrees F, wherein said esophagus-rib bone assembly is dehydrated for about 24–72 hours such that said bovine esophagus shrinks to substantially conform to the outer surface of said bovine rib bone.

32. The method of claim 31 further comprising cutting said esophagus-rib bone assembly to desired lengths.

33. The method of claim 31 wherein bovine shin bone is used instead of said bovine rib bone.

* * * * *